United States Patent [19]

Brown

[11] Patent Number: 5,036,442
[45] Date of Patent: Jul. 30, 1991

[54] ILLUMINATED WAND

[76] Inventor: Joseph T. Brown, 1710 Halsey, Independence, Kans. 67301

[21] Appl. No.: 630,503

[22] Filed: Dec. 20, 1990

[51] Int. Cl.⁵ .............................................. A63B 15/02
[52] U.S. Cl. .................................. 362/102; 362/800; 362/191; 362/252
[58] Field of Search ............... 362/102, 800, 184, 185, 362/190, 191, 249, 72, 205, 252

[56] References Cited

U.S. PATENT DOCUMENTS

| | | | |
|---|---|---|---|
| 618,706 | 1/1899 | Mead | 362/205 |
| 2,911,521 | 11/1959 | Schetz | 362/185 |
| 3,551,723 | 12/1970 | Van Groningen | 313/250 |
| 3,798,440 | 3/1974 | Brindley | 362/205 |
| 3,894,225 | 7/1975 | Chao | 240/40 |
| 4,164,008 | 8/1979 | Miller et al. | 362/103 |
| 4,271,458 | 6/1981 | George, Jr. | 362/236 |
| 4,345,305 | 8/1982 | Kolm et al. | 362/102 |
| 4,439,818 | 3/1984 | Scheib | 362/418 |
| 4,523,258 | 6/1985 | Morse et al. | 362/108 |
| 4,531,178 | 7/1985 | Uke | 362/205 |
| 4,598,339 | 7/1986 | Ainsworth | 362/72 |
| 4,761,720 | 8/1988 | Solow | 362/252 |
| 4,763,230 | 8/1988 | Cummings | 362/78 |
| 4,819,135 | 4/1989 | Padilla | 362/72 |
| 4,951,183 | 8/1990 | Wang | 362/205 |
| 4,967,321 | 10/1990 | Cimock | 362/102 |

FOREIGN PATENT DOCUMENTS 44300 1/1966 Fed. Rep. of Germany ...... 362/184

*Primary Examiner*—Ira S. Lazarus
*Assistant Examiner*—Y. Quach
*Attorney, Agent, or Firm*—Head & Johnson

[57] ABSTRACT

An illuminated wand incorporates a power source and a circuit board with an on-off switch and a plurality of electric light sources spaced along the length of opposite faces of the board within a rigid waterproof translucent cylindrical tube. The inside diameter of the tube is selected to removably encase the power source and the width of the board is substantially equal to the inside diameter of the tube so as to snugly encase the board. A pair of end caps are slidably mounted in substantially watertight condition on each end of the tube. A compressible spring between the power source and one of the caps maintains electrical contact between the components. A sequencer mounted on the board controls intermittent sequential operation of the light sources. The tube and the end caps may be tinted. Each of the caps has a clip connector usable to secure the wand to the object to be illuminated. The encasement of all the components in a single, rigid wand provides an illuminator readily adaptable to a wide variety of applications.

20 Claims, 1 Drawing Sheet

U.S. Patent July 30, 1991 5,036,442
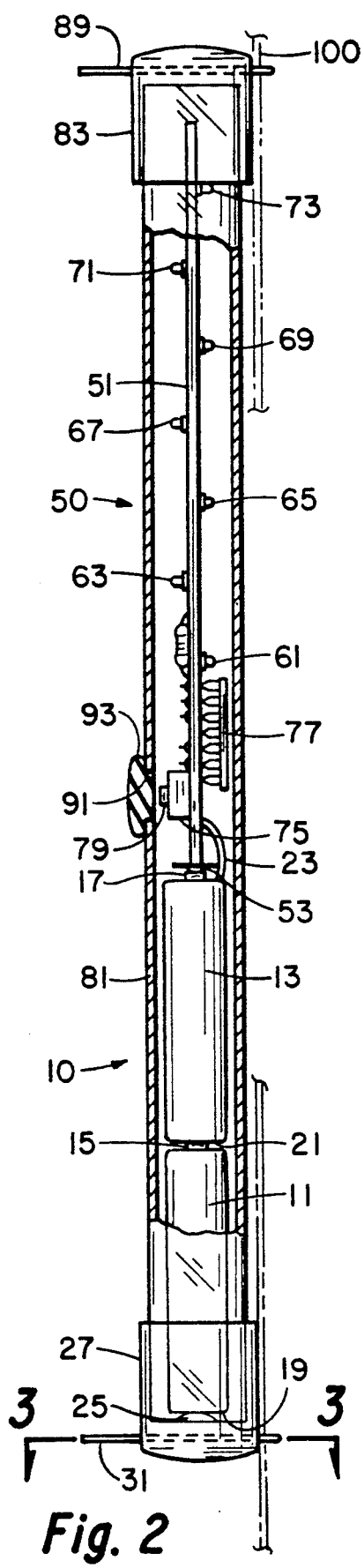
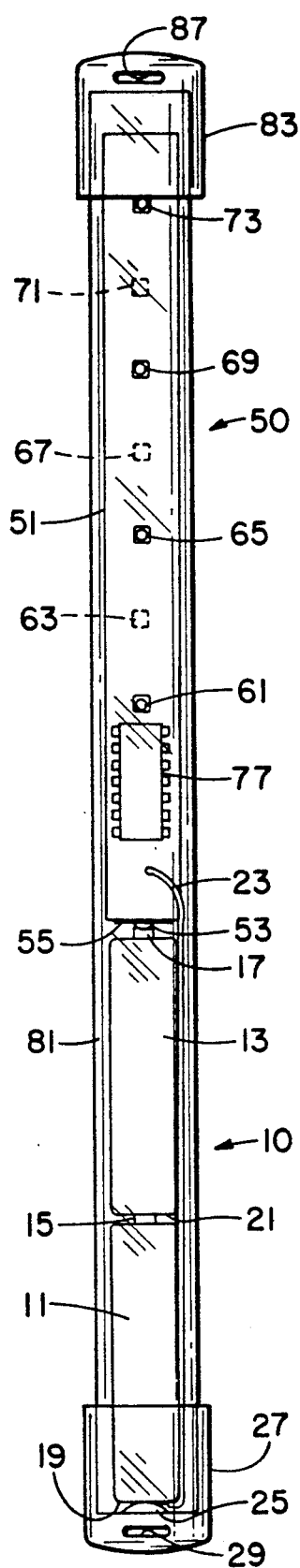
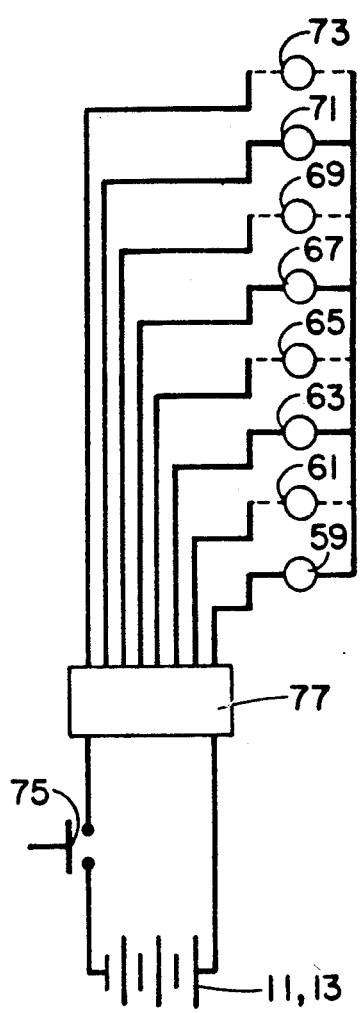
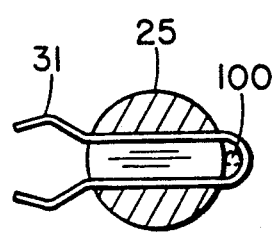
Fig. 2
Fig. 1
Fig. 4
Fig. 3

ILLUMINATED WAND

BACKGROUND OF THE INVENTION

This invention relates generally to devices facilitating visual location of persons or objects under conditions of low ambient light and more particularly concerns illuminated devices to be attached to or carried by such objects and persons.

A wide variety of illuminated devices usable to visually indicate the presence of persons or objects in low ambient light conditions have been designed for specific purposes ranging over a wide variety of applications. For example, strings of lights entwined in bicycle spokes and connected to a remote power source such as a battery pack mounted under the bicycle seat have been used for bicycle identification. Other flexible devices have been designed for use with or incorporation into various items of wearing apparel for identification of walkers and joggers and generally include a power source to be stored in a pocket provided in the apparel. Such strings of lights or pliable materials, while useful to the particular applications for which they are intended, in other applications become clumsy or cumbersome. Rigidly arranged light displays have also been designed which to some extent eliminate the difficulties of their flexible counterparts, but the known rigid light displays have other drawbacks. For example, the light sources, circuit elements and power sources are generally, at least in part, external of the rigid support member and therefore subject to damage from impact. Furthermore, even though the light display is rigidly mounted, the power source is generally a separate element independent of the rigid light display mounting piece. In overall evaluation, the rigid and flexible devices presently available are either so large, awkward, complex or expensive and directed to limited specific use as to be substantially impractical.

For example, while a string of lights entwined in bicycle spokes with a separate power source located under a bicycle seat serves the particular purpose for which it was designed, that device is highly impractical for use by an evening jogger.

Accordingly, it is one of the objects of this invention to provide an illuminated device that is small, compact, rigid, easily stored, totally self-contained, lightweight, highly visible, sturdy, and readily adaptable to a wide variety of visual location applications such as walkers and joggers, bicycles, automobiles and other motorized vehicles, pathways, obstacles and a virtually unlimited assortment of other applications.

SUMMARY OF THE INVENTION

In accordance with the invention, an illuminated wand incorporates a power source and a circuit board with an on-off switch and a plurality of electric light sources spaced along the length of opposite faces of the board within a rigid waterproof translucent cylindrical tube. The inside diameter of the tube is selected to removably encase the power source and the width of the board is substantially equal to the inside diameter of the tube so as to snugly encase the board. A pair of end caps are slidably mounted in substantially watertight condition on each end of the tube. A compressible spring between the power source and one of the caps maintains electrical contact between the components. A sequencer mounted on the board controls intermittent sequential operation of the light sources. The tube and the end caps may be tinted. Each of the caps has a clip connector usable to secure the wand to the object to be illuminated. The encasement of all the components in a single, rigid wand provides an illuminator readily adaptable to a wide variety of applications.

BRIEF DESCRIPTION OF THE DRAWINGS

Other objects and advantages of the invention will become apparent upon reading the following detailed description and upon reference to the drawings in which:

FIG. 1 is a bottom plan view of a preferred embodiment of the illuminated wand;

FIG. 2 is a side elevational view with parts broken away of the illuminated wand of FIG. 1;

FIG. 3 is a cross-sectional view taken along line 3—3 of FIG. 2; and

FIG. 4 is a schematic diagram of the electrical circuit of the illuminated wand of FIG. 1.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIGS. 1 and 2, a preferred embodiment of the illuminated wand includes a power segment 10 and an illuminated segment 50. The power segment includes an electrical power source such as two AA batteries 11 and 13 having positive terminals 15 and 17 and negative terminals 19 and 21 aligned end to end in series electrically. Any number of batteries of other size and configuration may of course be employed. The illuminated segment 50 includes an elongated circuit board 51 with a fixed electrical contact 53 disposed on a leading edge 55 of the board 51. A second electrical contact 57 is fixed on the board 51 in electrically isolated position with respect to the first electrical contact 53. This second contact 57 is connected by a flexible conductor such as an insulated wire 23 to a movable electrical contact 25. Spaced along the length of the circuit board 51 and on opposite sides of the board 51 are a plurality of electric light sources 59 through 73, preferably high brightness light emitting diodes. As shown, the light sources are alternatively space on opposite sides of the board 51 at equal distances apart, but this spacing and positioning may be varied in any desirable fashion. Also mounted on the board 51 is an on/off switch 75 and an electrical sequencer 77 used to control the sequence of operation of the light sources 59 through 73. The board 51 is a printed circuit board including, for example, the circuitry illustrated in FIG. 4 to sequentially flash the light sources from one end of the board 51 to the other. Of course, the light sources may be connected for continuous operation, for simultaneous flashing operation, for varied sequencing or any desired combination. The circuit board circuitry provides a rigid circuit structure extending from the fixed electrical contact 53 on the leading edge of the board 51 through the on-off switch 75, the sequencer 77, if necessary, and the light sources 59 through 73 to the second fixed electrical contact 57 on the board 51. As shown, the on-off switch 75 is a push-on-push-off pressure switch having an actuator 79 as its operable element. Other types of switches may be employed for operation of the wand in response to changes in sound or light intensity as well as weight and pressure changes.

The batteries 11 and 13 and the circuit board 51, including its component elements, are mounted within a rigid transparent tube 81 of preferably water impervious material. As shown, the tube is fully cylindrical but may be non-cylindrical or of any varying cross-section to accommodate the cross-sections of the batteries 11 and 13 and the board 51 and its components. A variety of plastics, preferably a high impact injection molded polycarbonate, may be used. In the embodiment shown, the inside diameter of the tube 81 is selected so that the batteries 11 and 13 may be removably inserted into the tube 81, yet substantially restricted in movement within the tube 81. Also, in the preferred embodiment, the width of the board 51 is selected to be substantially equal to the inside diameter of the tube 81 so that the board 51 will be snugly encased within the tube 81. The ends of the tube 81 are fitted with removable end caps 27 and 83 slide snugly on the tube 81. As best seen in FIG. 3, with respect to the end cap 27, the caps 27 and 83 are provided with a diametric slot 29 or 87 into which a resiliently compressible clip 31 or 89 can be removably inserted.

In the overall assembly of the illuminated wand, the circuit board 51 is slid into the illuminated segment 50 of the wand with its side edges abutting the inside walls of the tube 81 so as to hold the board 51 in place in the tube 81. The batteries 11 and 13 are slid into the power segment 10 of the tube 81 with positive terminal 17 in contact with the fixed contact 53 on the leading edge 55 of the board 51 and the positive terminal 15 of battery 11 in contact with the negative terminal 21 of battery 13. The insulated wire 23 extends from the second contact 57 of the board 51 between the batteries 11 and 13 and the sidewall of the tube 81 so that the movable contact 25 can abut the negative terminal 19 of the battery 11. The length of the tube 81 is selected so that, with the batteries 11 and 13 and the board 51 mounted within the tube 81, application of the end caps 27 and 83 will secure these components in electrical connection within the tube 81. In a preferred embodiment of the wand, the movable contact 25 includes a compressible spring for assuring maintenance of electrical contact between the movable contact 25, the batteries 11 and 13 and the board 51.

In the embodiment shown, the push-on-push-off switch 75 is operated by the actuator 79. An aperture 91 is provided through the tube 81 in alignment with the actuator 79. A flexibly resilient cover 93 is mounted over the aperture 91 in a substantially water tight condition to permit operation of the actuator 79 by manual application of pressure to the exterior surface of the flexible cover 93.

The snug connection of the end caps 27 and 83 and the cover 93 with the tube 81 provides a substantially waterproof wand usable in many applications. For example, the wand may be secured to a bicycle spoke 100 by aligning the slots 29 and 87 with the spoke 100 and inserting the clips 31 and 89 into their respective end caps 27 and 89. Alternatively, the clips 31 and 89 may be used to fasten flexible material to the wand so that the wand may be tied or otherwise fastened to a variety of objects. Additionally, the wand may be carried in the hand of a walker or jogger with the illuminated segment 50 exposed for observation. Many other uses and applications of the wand will be readily apparent.

It is contemplated that portions of the tube 81 or the end caps 27 and 83 may be tinted to increase visibility or the attractiveness of the wand. For example, the illuminated segment may be tinted red and the end caps 27 and 83 tinted yellow so as to incorporate the vehicular traffic meaning of these colors into the illuminated wand.

Thus, it is apparent that there has been provided, in accordance with the invention, an illuminated wand that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. An illuminated wand comprising:
   at least one battery having a negative terminal and a positive terminal on opposite ends thereof;
   an elongated circuit board having a first electrical contact fixed on a leading edge thereof and a second electrical contact isolated from said first contact;
   a movable contact electrically connected to said second contact by a length of flexible conductor;
   an on-off switch mounted on said board;
   a plurality of electric light sources spaced along the length of opposite faces of said board;
   circuit means on said board for electrically connecting said switch and said light sources between said first and second contacts;
   a rigid waterproof translucent tube means for encasing said at least one battery and said board in lengthwise relationship with one of said battery terminals facing and aligned with said first contact; and
   a pair of end caps, one slidably mounted in substantially watertight condition on each end of said tube means with said movable contact disposed between one of said end caps and the other of said battery terminals for securing said movable contact, said at least one battery and said board in electrical contact within said tube means.

2. An illuminated wand according to claim 1, said movable contact including a compressible spring means for maintaining electrical contact between said movable contact, said at least one battery and said board.

3. An illuminated wand according to claim 1, said circuit means having an electrical sequencing means mounted on said board for intermittent sequential operation of said light sources.

4. An illuminated wand according to claim 1, said switch having a push on/push off actuator, said tube means having an aperture therethrough aligned with said actuator and said wand further comprising external flexibly resilient means mounted in substantially watertight condition over said aperture for manual operation of said actuator.

5. An illuminated wand according to claim 1, each of said light sources comprising a light emitting diode.

6. An illuminated wand according to claim 1, the board encasing portion of said tube means being tinted.

7. An illuminated wand according to claim 6, said end caps being tinted.

8. An illuminated wand according to claim 1, each of said end caps having a slot through an end wall thereof and a resiliently compressible clip means detachably engagable therein for attaching said wand to an external object.

9. An illuminated wand according to claim 1, said tube means having an interior contour selected to removably encase said at least one battery while restricting radial movement of said at least one battery therein.

10. An illuminated wand according to claim 9, said board having a width substantially confined to said interior contour of said tube means for snugly encasing said board therein.

11. An illuminated wand comprising:
at least one battery having a negative terminal and a positive terminal on opposite ends thereof;
an elongated circuit board having a first electrical contact fixed on a leading edge thereof and a second electrical contact isolated from said first contact;
a movable contact electrically connected to said second contact by a length of flexible conductor;
an on-off switch mounted on said board;
a plurality of electric light sources spaced along the length of opposite faces of said board;
circuit means on said board for electrically connecting said switch and said light sources between said first and second contacts;
a rigid waterproof translucent cylindrical tube means for encasing said at least one battery and said board in lengthwise relationship with one of said battery terminals facing and aligned with said first contact, said tube means having an inside diameter selected to removably encase said at least one battery while restricting radial movement of said at least one battery therein and said board having a width substantially equal to said inside diameter of said tube means for snugly encasing said board therein;
a pair of end caps, one slidably mounted in substantially watertight condition on each end of said tube means with said movable contact disposed between one of said end caps and the other of said battery terminals for securing said movable contact, said at least one battery and said board in electrical contact within said tube means; and
means external of said tube means for operating said switch.

12. An illuminated wand according to claim 11, said circuit means having an electrical sequencing means mounted on said board for intermittent sequential operation of said light sources.

13. An illuminated wand according to claim 11, each of said light sources comprising a light emitting diode.

14. An illuminated wand according to claim 11, each of said end caps having a diametric slot through an end wall thereof and a resiliently compressible clip means detachably engagable therein for attaching said wand to an external object.

15. An illuminated wand comprising:
at least one battery having a negative terminal and a positive terminal on opposite ends thereof;
an elongated circuit board having a first electrical contact fixed on a leading edge thereof and a second electrical contact isolated from said first contact;
a movable contact electrically connected to said second contact by a length of flexible conductor;
an on-off switch mounted on said board, said switch having a push on/push off actuator;
a plurality of electric light sources spaced along the length of opposite faces of said board;
circuit means on said board for electrically connecting said switch and said light sources between said first and second contacts;
a rigid waterproof translucent cylindrical tube means for encasing said at least one battery and said board in lengthwise relationship with one of said battery terminals facing and aligned with said first contact, said tube means having an inside diameter selected to removably encase said at least one battery while restricting radial movement of said at least one battery therein and an aperture therethrough aligned with said actuator and said board having a width substantially equal to said inside diameter of said tube means for snugly encasing said board therein;
a pair of end caps, one slidably mounted in substantially watertight condition on each end of said tube means with said movable contact disposed between one of said end caps and the other of said battery terminals for securing said movable contact, said at least one battery and said board in electrical contact within said tube means; and
flexibly resilient means mounted in substantially watertight condition over said aperture through said tube means for manual operation of said switch.

16. An illuminated wand according to claim 15, said movable contact including a compressible spring means for maintaining electrical contact between said movable contact, said at least one battery and said board.

17. An illuminated wand according to claim 15, said circuit means having an electrical sequencing means mounted on said board for intermittent sequential operation of said light sources.

18. An illuminated wand according to claim 15, each of said light sources comprising a light emitting diode.

19. An illuminated wand according to claim 15, the board encasing portion of said tube means being tinted.

20. An illuminated wand according to claim 19, said end caps being tinted.

* * * * *